(12) United States Patent
Sugiura et al.

(10) Patent No.: US 7,842,369 B2
(45) Date of Patent: Nov. 30, 2010

(54) HONEYCOMB STRUCTURE BODY HAVING HEXAGONAL CELLS AND MANUFACTURING METHOD THEREOF

(75) Inventors: Fumiya Sugiura, Takahama (JP); Akio Iwase, Nishio (JP)

(73) Assignee: Denso Corporation, Kariya (JP)

( * ) Notice: Subject to any disclaimer, the term of this patent is extended or adjusted under 35 U.S.C. 154(b) by 941 days.

(21) Appl. No.: 11/523,742

(22) Filed: Sep. 20, 2006

(65) Prior Publication Data

US 2007/0065631 A1 Mar. 22, 2007

(30) Foreign Application Priority Data

Sep. 20, 2005 (JP) ............................. 2005-271551

(51) Int. Cl.
*B32B 3/12* (2006.01)
(52) U.S. Cl. ....................................... 428/116; 428/118
(58) Field of Classification Search ................... 428/116
See application file for complete search history.

(56) References Cited

U.S. PATENT DOCUMENTS

| | | | |
|---|---|---|---|
| 3,903,341 A * | 9/1975 | Gerhold | 428/116 |
| 4,323,614 A * | 4/1982 | Gulati | 428/116 |
| 5,494,881 A | 2/1996 | Machida et al. | |
| 6,468,374 B1 | 10/2002 | Kar et al. | |
| 6,548,142 B1 | 4/2003 | Kar et al. | |
| 6,713,429 B1 | 3/2004 | Tanaka et al. | |
| 6,765,174 B2 | 7/2004 | Fukushima | |
| 6,887,826 B2 | 5/2005 | Nishimura | |
| 7,164,098 B2 | 1/2007 | Fukushima | |
| 2002/0117773 A1 | 8/2002 | Yamada et al. | |
| 2005/0163675 A1 | 7/2005 | Nishimura | |

FOREIGN PATENT DOCUMENTS

| | | |
|---|---|---|
| DE | 27 08 908 | 3/1977 |
| EP | 1125704 B1 | 5/2006 |
| JP | 52-119611 | 10/1977 |

(Continued)

OTHER PUBLICATIONS

German Official Action dated Feb. 7, 2008, issued in corresponding German Application No. 10 2006 000 467.1-41 with English translation.

(Continued)

*Primary Examiner*—Gordon R Baldwin
(74) *Attorney, Agent, or Firm*—Nixon & Vanderhye PC

(57) ABSTRACT

A honeycomb structure body has a plurality of hexagonal cells of a hexagonal shape formed in a lattice arrangement. Each hexagonal cell is surrounded by its hexagonal cell wall composed of six sides. On a cross-sectional surface along the axis direction of the ceramic honeycomb structure body, each side in the six sides forming the hexagonal cell wall surrounding the corresponding hexagonal cell is a concave shape toward either the inside of or the outside of the hexagonal cell. In particular, it is preferred that continuous three sides in each hexagonal cell wall has a concave shape that is concave toward either the inside or the outside of the hexagonal cell, and the remaining continuous three sides in the cell wall has a concave shape that is concave toward the opposite direction to the direction of the concave shape formed by the above continuous three sides.

15 Claims, 7 Drawing Sheets

FOREIGN PATENT DOCUMENTS

| | | |
|---|---|---|
| JP | H05-123580 | 5/1993 |
| JP | H07-039761 | 2/1995 |
| JP | 10-059784 | 3/1998 |
| JP | H10-059784 | 3/1998 |
| JP | 2000-237602 | 9/2000 |
| JP | 2002-301581 | 10/2002 |
| JP | 2002-321210 | 11/2002 |
| JP | 2002-537205 | 11/2002 |
| JP | 2002-355511 | 12/2002 |
| WO | WO01/015877 | 3/2001 |

OTHER PUBLICATIONS

Japanese Official Action dated Mar. 25, 2008, issued in corresponding Japanese Application No. 2005-271551, with English translation.

* cited by examiner

HONEYCOMB STRUCTURE BODY HAVING HEXAGONAL CELLS AND MANUFACTURING METHOD THEREOF

CROSS-REFERENCE TO RELATED APPLICATIONS

This application is related to and claims priority from Japanese Patent Application No. 2005-271551 filed on Sep. 20, 2005, the contents of which are hereby incorporated by reference.

BACKGROUND OF THE INVENTION

1. Field of the Invention

The present invention relates to a honeycomb structure body having a plurality of hexagonal cells arranged in a lattice shape and a manufacturing method thereof, and in particular, relates to a honeycomb structure body having a plurality of hexagonal cells in which each hexagonal cell is surrounded by a hexagonal cross-sectional cell wall composed of six sides.

2. Description of the Related Art

A conventional honeycomb structure body (as a monolithic support) has a plurality of square-shaped cells placed in a lattice arrangement and is used as a catalyst support and the like in an exhaust gas purifying filter for purifying particulate matters (PM) involved in exhaust gas emitted from an internal combustion engine such as a diesel engine and a gasoline engine mounted on a vehicle. Each cell in such a conventional honeycomb structure body has a square cross-sectional shape. For example, Japanese patent laid open publications JP H7-39761, JP 2000-237602, and JP 2002-321210 have disclosed such a conventional honeycomb structure body.

It has been typical to employ square shaped cells (or square cells) in a honeycomb structure body because of easy making its die for use in an extrusion molding and of manufacturing efficiency. However, such square cells forming the conventional honeycomb structure body involves a drawback to support excess amount of catalyst at four corners of each square cell wall (or each square partition wall) when the catalyst is supported on the square cell walls of each square cell. This excess amount of catalyst at four corners in each square cell further prevents the smoothing flow of exhaust gas.

Recently, a ceramic honeycomb structure body having hexagonal cross-sectional cells has been proposed in order to increase the purifying ability to purify the exhaust gas emitted from an internal combustion engine mounted on a vehicle. Such a ceramic honeycomb structure body has a plurality of hexagonal cross-sectional cells (hereinafter, referred also to as "a hexagonal honeycomb structure body") and each hexagonal cell is capable of supporting a uniform amount of catalyst on its cell wall and of flowing the exhaust gas therethrough smoothly. Such a hexagonal cell can increase the purifying capability in the amount of catalyst, a pressure loss, the amount of exhaust gas of hydrocarbons and the like.

However, such a ceramic honeycomb structure body having a plurality of hexagonal cross-sectional cells has not flexibility to escape or distribute a stress applied from the inside and outside of the ceramic honeycomb structure body because each side of the hexagonal cross-sectional cell wall is formed in a straight line shape. Thereby, damage and cracking occur by the stress applied from the inside or the inside of the ceramic honeycomb structure body when such a hexagonal ceramic honeycomb structure body is mounted on a vehicle, or occur by vibration and thermal impact while mounting on a vehicle. In other wards, such a conventional hexagonal ceramic honeycomb structure body does not have a high flexibility to applied stress, does not have a high durability and a thermal shock resistance during the use.

SUMMARY OF THE INVENTION

The present invention is designed to address the above mentioned objects and prior art deficiencies. It is an object of the present invention to provide a ceramic honeycomb structure body having a plurality of hexagonal cells and a manufacturing method thereof, having superior flexibility to a stress, a superior durability and a highly thermal shock resistance.

To achieve the above objects, the present invention provides a honeycomb structure body having a plurality of hexagonal cross-sectional cells (or hexagonal cells) formed in a lattice arrangement. Each hexagonal cell of a hexagonal cross-sectional shape is surrounded by six sides that form a hexagonal cell wall of a hexagonal shape. In the honeycomb structure body, each side of the hexagonal cell wall has a concave-curved shape (or a concave shape) toward one of an inside and an outside of the hexagonal cell on a cross-sectional surface of the honeycomb structure body along its an axis direction.

In the honeycomb structure body according to the present invention, the hexagonal cell wall is composed of the six sides surrounding the hexagonal cell of a hexagonal cross-sectional shape. Each side in the six sides forming the hexagonal cell wall has a concave shape toward either the inside or the outside of the hexagonal cell. That is, when observing one hexagonal cell, each side of the hexagonal cell wall has a concave shape or an arc shape (namely, a character "C" shape) toward the inside or the outside of a straight line connected between a pair of adjacent vertexes of the hexagonal cell wall. This configuration of the sides forming the hexagonal cell wall of each hexagonal cell can distribute a stress applied from the outside or the inside of the honeycomb structure body toward the sides of the hexagonal cell wall.

When compared with the conventional honeycomb structure body having a configuration such as each side forming a cell wall has a straight line shape, the honeycomb structure body of the present invention has a superior flexibility to stress to be applied. This feature of the present invention can suppress the magnitude of damage caused by mounting this honeycomb structure body on a vehicle, and can further suppress bad influences caused by vibration and thermal shock while the vehicle is traveling. According to the present invention, it is possible to have the superior flexibility to the stress applied from the inside and outside of the honeycomb structure body and to provide the honeycomb structure body with a high durability and a superior anti-thermal shock.

Another aspect of the present invention is a manufacturing method of manufacturing the honeycomb structure body including steps of an extruding and molding step, a cutting step, a drying step, and a burning step. In the extruding and molding step, ceramic raw materials is extruded, in order to make a honeycomb molded body, by using an extrusion molding die. The extrusion molding die has plural slit grooves corresponding to a shape of hexagonal cell wall of hexagonal cells in the honeycomb structure body finally produced. In the cutting step, the honeycomb molded body is cut into a plurality of honeycomb shaped bodies with a specified length. In the drying step, the honeycomb shaped body is dried at a specified temperature for a predetermined time. In the burning step, the honeycomb shaped body is burned in order to produce the honeycomb structure body having a plurality of hexagonal cells.

In the manufacturing method, the extrusion molding is performed by using the extrusion molding die. This extrusion molding die has the slit grooves corresponding to the shape of each hexagonal cell wall in each hexagonal cell in the honeycomb structure body finally produced. The execution of the extrusion molding process using the extrusion molding die having the above configuration can easily make the honeycomb molded body corresponding to the shape of the honeycomb structure body according to the present invention. The honeycomb structure body manufactured by the above manufacturing manner can have the superior flexibility to the stress applied from the inside and outside of the honeycomb structure body and further has a high durability and a superior anti-thermal shock.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
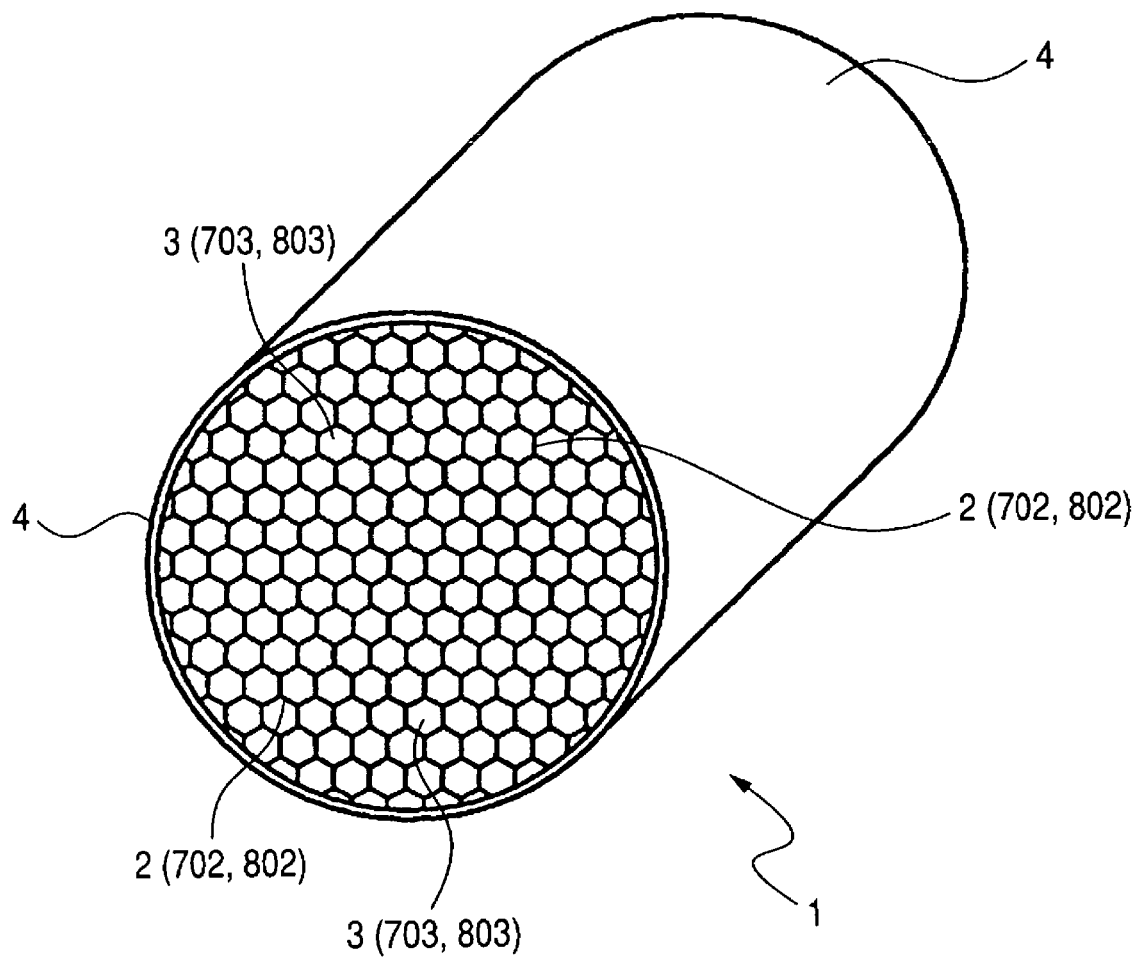
FIG. 1 is a perspective view of a honeycomb structure body having a plurality of hexagonal cells (each hexagonal cell having a hexagonal cross-sectional shape) according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a honeycomb structure body having a plurality of hexagonal cells according to the first embodiment of the present invention with reference to FIG. 1 to FIG. 3.

FIG. 1 is a perspective view of the honeycomb structure body having a plurality of hexagonal cells according to the first embodiment of the present invention. As shown in FIG. 1, the honeycomb structure body 1 has a plurality of hexagonal cells 3 in which each hexagonal cell has a hexagonal cross-sectional shape arranged in a lattice arrangement. Hereinafter, the honeycomb structure body 1 of the present invention will also be referred to as "the hexagonal honeycomb structure body 1".

Each hexagonal cell 3 of a hexagonal cross-sectionals shape is surrounded by a cell wall (or a hexagonal cell wall, as a partition wall) composed of six sides. The six sides of each cell wall 2 form a hexagonal cross-sectional shaped wall that surrounds the corresponding hexagonal cell 3.

Figure 2:
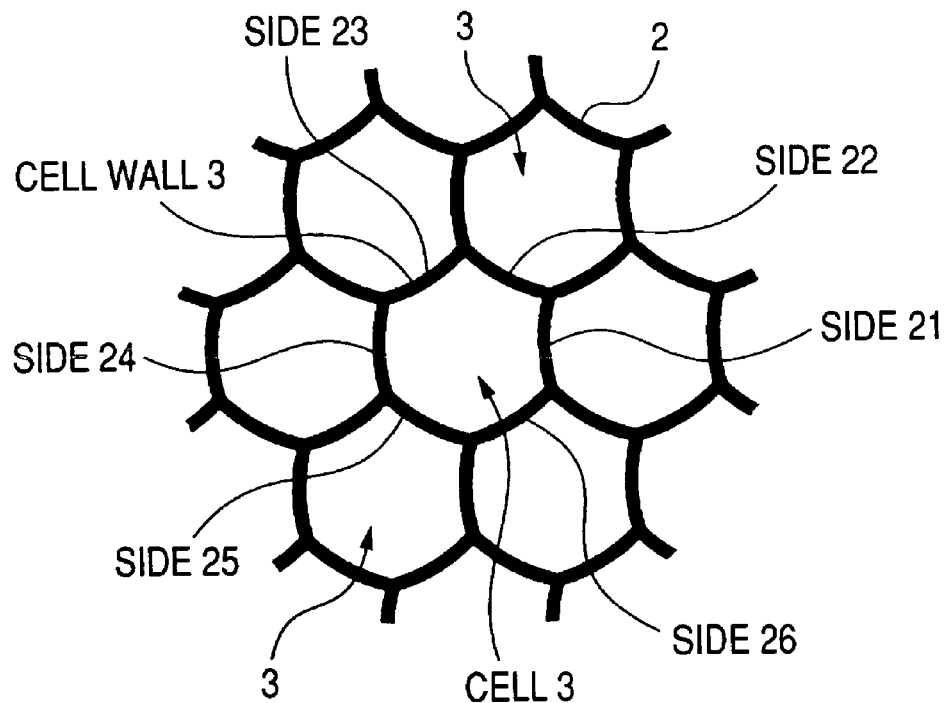
FIG. 2 is a diagram showing cell walls (or partition walls) in hexagonal cells in the honeycomb structure body of the first embodiment shown in FIG. 1.

FIG. 2 is a diagram showing the cell walls 2 (or the partition walls) of the hexagonal cells 3 in the honeycomb structure body 1 according to the first embodiment shown in FIG. 1. As clearly shown in FIG. 2, each of the sides 21 to 26 forming the hexagonal cell wall 2 that surrounds its corresponding hexagonal cell 3 has a concave curved shape, not a straight-line shape. Each of the sides 21 to 26 of the hexagonal cell wall 2 on the cross sectional surface of the honeycomb structure body 1 along the axis direction shown in FIG. 1 is a convex curved shape or a concave curved shape toward the adjacent hexagonal cells.

A description will now be given of the detailed configuration of each side of the hexagonal cell wall 2 that surrounds the corresponding hexagonal cell 3.

The honeycomb structure body 1 having a plurality of the hexagonal cells 3 according to the present invention can be used as an exhaust gas purifying filter for a gasoline engine, for example.

As shown in FIG. 1, the honeycomb structure body has a cylindrical shaped outline, and the outer peripheral surface of the honeycomb structure body is covered with an outer peripheral skin part 4. A total of 600 meshes (the number of the hexagonal cells 3 are 600) are formed in the inside of the outer peripheral skin part 4.

The honeycomb structure body 1 is made of ceramic composed mainly of cordierite. The outer diameter of the ceramic honeycomb structure body 1 is approximately 103.0 mm, and the length thereof is approximately 100.0 mm. The thickness of the outer peripheral skin part 4 thereof is approximately 0.3 mm, and the pore volume thereof is within a range of 30% to 40%. FIG. 1 simply shows a perspective view of the honeycomb structure body 1 having a plurality of the hexagonal shaped cells 3 for brevity.

As shown in FIG. 2, on observing one hexagonal cell 3 placed at a center part of the plural hexagonal cells 3 arranged in a lattice form, this hexagonal cell 3 (also another hexagonal cell) is surrounded by the hexagonal cell wall 2. The hexagonal cell wall 2 is composed of the six sides 21 to 26. The continuous three sides 21 to 23 in the six sides 21 to 26 have a concave-curved shape (namely, the character "C" shape or a circular arc shape) toward the inside of the hexagonal cell 3. The remaining continuous three sides 24 to 26 have a convex curved shape (namely, the character "C" shape or a circular arc shape) toward the outside of the hexagonal cell 3. The thickness of each hexagonal cell wall 2 is approximately 90 μm, and a cell pitch is approximately 1.11 μm.

The optimum thickness of each hexagonal cell wall 2, namely, the optimum thickness of each side of the hexagonal cell wall 2 is determined based on the longitudinal length and the diameter of the honeycomb structure body 1, the number of the cells or the meshes, the length of the cell pitch, and the like. It is preferred that the thickness of the hexagonal cell wall 2 is within a range of 30 µm to 110 µm.

A description will now be given of the detailed configuration of each side of the hexagonal cell wall 2 that surrounds the hexagonal cell 3 with reference to FIG. 3. FIG. 3 is a diagram showing a detailed hexagonal cross-sectional shape of the hexagonal cell wall 2 (or the partition wall) in each hexagonal cell 3 shown in FIG. 2.

Figure 3:
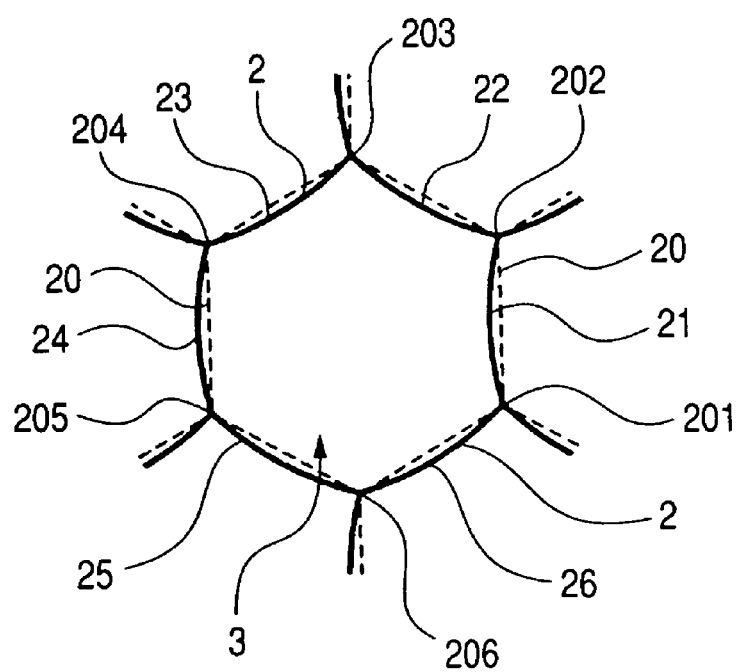
FIG. 3 is a diagram showing a detailed shape of each cell wall (or a partition wall) in each hexagonal cell shown in FIG. 2.

As shown in FIG. 3, each dotted line designates a straight lines connected between a pair of the six vertexes 202 to 206 of the hexagonal cell wall 2. For example, the side 21 has the convex curved shape toward the inside of the hexagonal cell 3, namely the character "C" shape (or a circular arc shape) when compared with the straight line connected between the vertex 201 of the side 21 and the vertex 202 of the side 22. Similar to the side 21, both of the sides 22 and 23 have the same character "C" shape (or a circular arc shape). On the contrary, the side 24 has the convex curved shape toward the outside of the hexagonal cell 3. Similar to the side 24, both of the sides 25 and 26 have the same character "C" shape (or a circular arc shape) toward the outside of the hexagonal cell 3.

Each of the sides 21 to 26 in the hexagonal cell 3 in the honeycomb structure body 1 according to the first embodiment has an arc shape. The present invention is not limited by such a configuration of each side of the hexagonal cell wall 2. It is possible for each side of the hexagonal cell wall 2 surrounding the hexagonal cell 3 to have another shape.

Next, a description will now be given of the manufacturing method of the honeycomb structure body 1 according to the first embodiment of the present invention with reference to FIG. 12.

Figure 12:
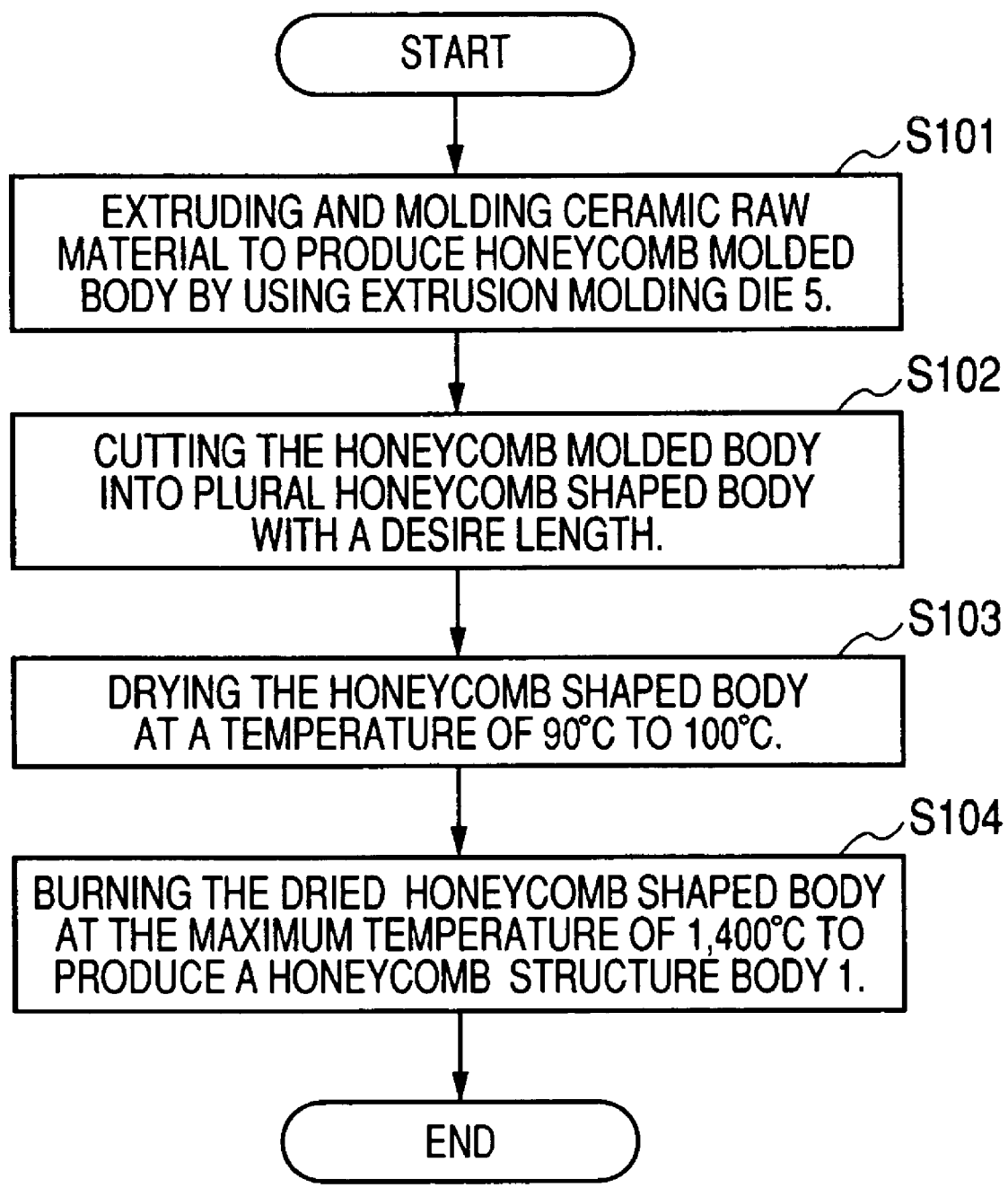
FIG. 12 is a flowchart showing a manufacturing method of manufacturing the honeycomb structure body 1 according to the first embodiment of the present invention.

FIG. 12 is a flowchart showing a manufacturing method of manufacturing the honeycomb structure body 1 according to the first embodiment of the present invention.

The manufacturing method of the honeycomb structure body 1 of the first embodiment has at least following steps: an extrusion molding process S101; a cutting process S102; a drying process S103; and a burning process S104.

Using cordierite as a ceramic raw material which is composed mainly of kaolin, fused silica, and aluminum hydroxide, alumina, talc, and carbon particles and the like mixed in optimum proportions, the extrusion molding process S101 makes a honeycomb molded body.

In the cutting process S102, the honeycomb molded body is cut into plural honeycomb shaped bodies, each having a specified length. In the drying process S103, each honeycomb shaped body is dried. Finally, in the burning process S104, the honeycomb shaped body is burned in order to produce the honeycomb structure body 1 of the first embodiment.

Figure 4:
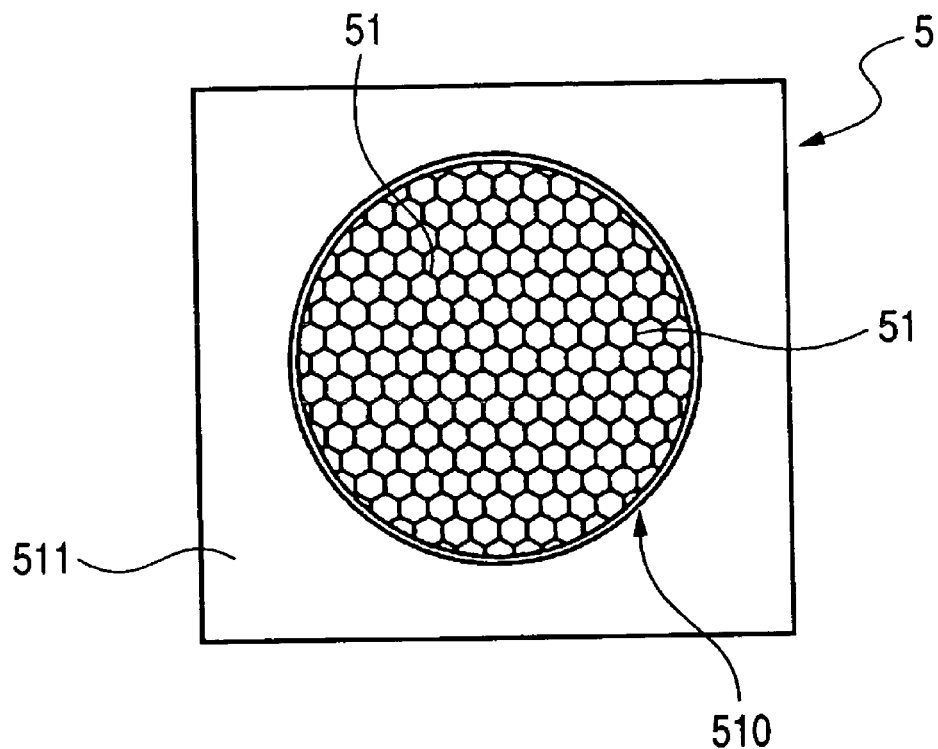
FIG. 4 is a diagram showing a structure of an extrusion molding die to be used during an extrusion molding process of manufacturing the honeycomb structure body according to the first embodiment of the present invention shown in FIG. 1, FIG. 2, and FIG. 3.
Figure 5:
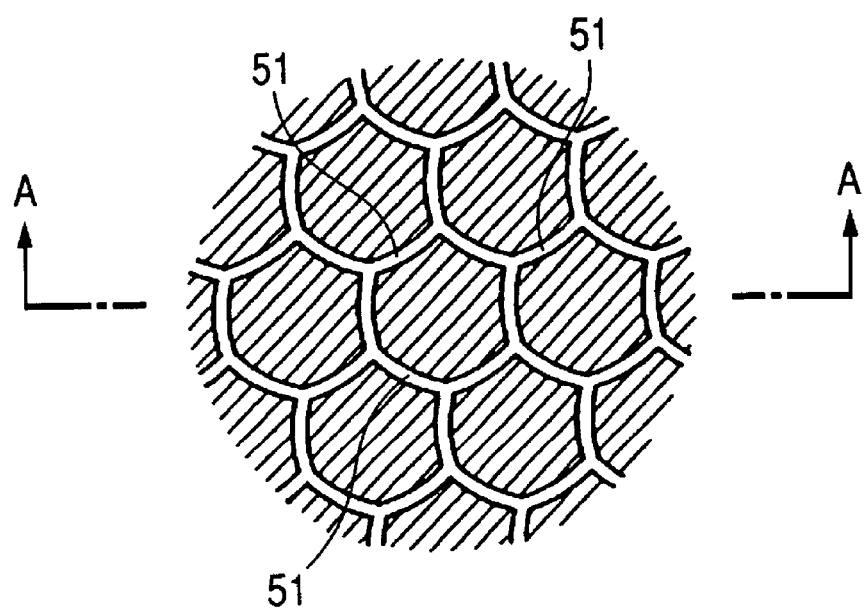
FIG. 5 is an enlarged detailed diagram showing a structure of each slit groove in the extrusion molding die shown in FIG. 4.
Figure 6:
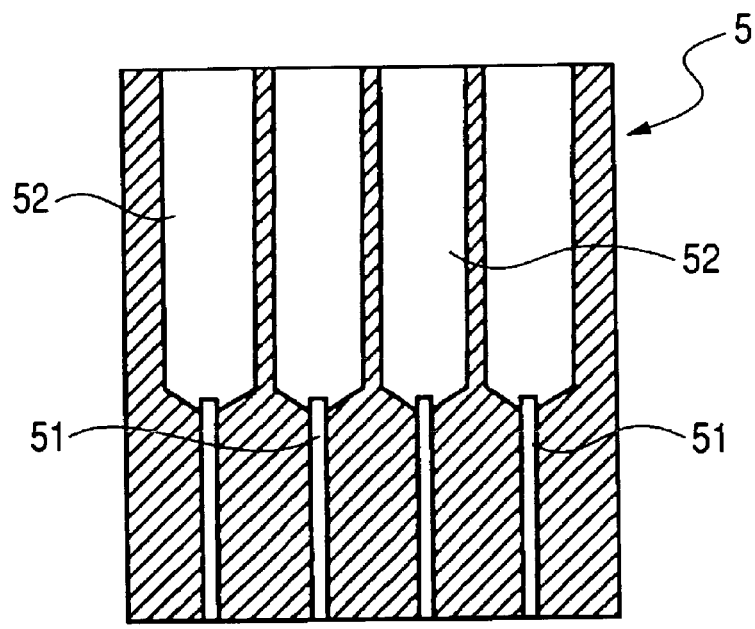
FIG. 6 is a sectional diagram of the structure of the extrusion molding die along A-A line in FIG. 5.

The extrusion molding process S101 extrude the honeycomb molded body using an extrusion molding die 5 having slit grooves 51 as shown in FIG. 4 to FIG. 6. The shape of the slit grooves 51 of the extruding molding die 5 corresponds to the shape of the cell wall 2 of the honeycomb structure body 1 finally produced.

In the extrusion molding process S101, ceramic raw powders are firstly made, which are composed mainly of kaolin, fused silica, aluminum hydroxide, alumina, talc, carbon particle and the like, and whose composition usually includes 45.0-55.0 wt % of $SiO_2$, 33.0-42.0 wt % of $Al_2O_3$ and 12.0-18.0 wt % of MgO. Water and binders of a desired volume are added into those ceramic raw powders, and then mixed together so as to obtain the ceramic raw material.

Next, a description will now be given of the shape of the extrusion molding die 5 for use in the extrusion molding process S101 of the ceramic raw material with reference to FIG. 4 and FIG. 5.

FIG. 4 is a diagram showing a structure of the extrusion molding die 5 for use in the extrusion molding process S101 in the manufacturing method to manufacture the honeycomb structure body 1 according to the first embodiment of the present invention shown in FIG. 1 to FIG. 3.

FIG. 5 shows an enlarged detailed diagram of the shape of each slit groove formed in the extrusion molding die 5 shown in FIG. 4. FIG. 6 is a sectional diagram of the structure of the extrusion molding die 5 along A-A line in FIG. 5.

As shown in FIG. 4, FIG. 5, and FIG. 6, the extrusion molding die 5 to be used in the manufacturing process of manufacturing the honeycomb structure body 1 of the first embodiment has the slit grooves 51 in a groove forming part 510 (see FIG. 4) which is protruded from the peripheral part 511 thereof. Those slit grooves 51 correspond to the shape (see FIG. 2) of the hexagonal cell walls 2 (or the partition walls 2) of the honeycomb structure body 1. As clearly shown in FIG. 6, the slit grooves 51 are joined to or connected to the supply holes 52 through which the ceramic raw material is supplied during the extrusion molding process S101 into the slit grooves 51 of the extrusion molding die 5. FIG. 4 shows each slit groove 51 with a simple hexagonal cross-sectional shape for brevity.

The slit grooves 51 are formed in a water-jet laser cutting process using a water-jet processing machine. Because such a water-jet processing machine easily controls the position of each of the slit grooves 51, and it can form the slit grooves 51 in the extrusion molding die 5 with an extremely high accuracy.

The ceramic raw material described above is extruded and molded by using the extrusion molding die 5 in order to produce the honeycomb structure body.

Next, in the cutting process, the honeycomb body is cut into a desired length. In the drying process, the honeycomb body is dried at a temperature of 90° C. to 100° C. In the burning process, the honeycomb body after drying is burned at the maximum temperature of 1,400° C. in order to produce the honeycomb structure body 1 of the first embodiment shown in FIG. 1.

Next, a description will now be given of the action and effects of the honeycomb structure body 1 of the first embodiment of the present invention.

In the first embodiment, each of the six sides 21 to 26 of the cell wall 2 which surrounds the hexagonal cell 3 has a concave-curved shape to the inner side or the outer side of the hexagonal cell 3. that is, when one hexagonal cell 3 is observed, each of the sides 21 to 26 is a concave-curved shape (namely, the character "C" shape or a circular arc shape) toward the inside or outside of the hexagonal cell 3 when compared with a straight line connected between the vertexes of the sides 21 to 26, as shown in FIG. 2 and FIG. 3. According to the shape of each of the sides 21 to 26 in the hexagonal cell 3 in the honeycomb structure body 1 of the first embodiment, even if a stress is applied to the honeycomb structure body 1, the shape of each of the six sides 21 to 26 in the hexagonal cell 3 is distributed.

When compared with the cell in the conventional honeycomb structure body and whose side has a straight line shape, the honeycomb structure body 1 having the hexagonal cells 3 surrounded by the sides 21 to 26 of the hexagonal cell wall 2 has flexibility to stress applied from the inside and outside of the honeycomb structure body 1. Thereby, this configuration of the honeycomb structure body 1 of the first embodiment can suppress the magnitude of the impact caused on mounting or assembling it on a vehicle, and can suppress the magnitude of vibration and thermal impact occurred during the vehicle runs.

In the first embodiment, it is so formed that the three sides 21 to 23 in the sides 21 to 26 has the concave-curved shape toward the inside of the hexagonal cell 3, and the sides 24 to 26 has the concave-curved shape toward the outside of the hexagonal cell 3. This configuration of the sides 21 to 26 can promote the flexibility to stress applied from the outside of the honeycomb structure body 1.

In addition, the honeycomb structure body 1 having a plurality of the hexagonal cells 3 has the outer peripheral skin part 4 formed on the outer peripheral surface of the body 1. This configuration can reduce the magnitude of stress applied from the outside of the honeycomb structure body 1. For example, such a configuration of the honeycomb structure body 1 can suppress the damage caused by the impact occurred when the honeycomb structure body 1 is mounted on a vehicle.

The thickness of each cell wall 2 in the honeycomb structure body 1 is approximately 110 μm or less. This configuration of the cell wall 2 can also distribute the stress applied from the inside and outside of the honeycomb structure body 1.

Further, the manufacturing method according to the first embodiment uses a water-jet laser apparatus for making the slit grooves 51 of the extrusion molding die 4. The water-jet laser apparatus can make the slit grooves that correspond to cell walls of a complicated shape at a high accuracy and easily. The honeycomb structure body 1 having a plurality of the hexagonal cells 3 according to the first embodiment is formed with an extremely high accuracy by using the extrusion molding die 5.

The honeycomb structure body 1 of the first embodiment has the adequate flexibility to the stress applied from the inside and the outside of the body 1. This superior feature of the honeycomb structure body 1 of the first embodiment can increase its durability and anti-thermal impact in use.

Figure 7:
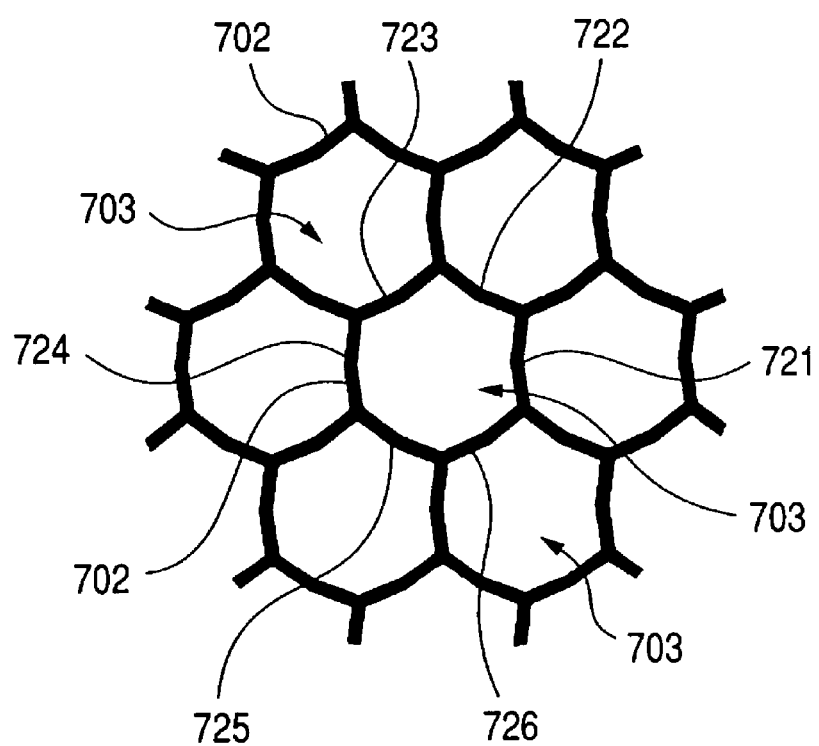
FIG. 7 is a diagram showing another configuration of cell walls (or partition walls) in the hexagonal cells in the honeycomb structure body shown in FIG. 1.

FIG. 7 is a diagram showing another configuration of hexagonal cell walls 702 (or partition walls) surrounding the hexagonal cross-sectional cells in the honeycomb structure body 1 shown in FIG. 1.

Although each of the sides 21 to 26 of the cell wall 2 shown in FIG. 2 to FIG. 2 and FIG. 3 has a single concave-curved shape in the honeycomb structure body 1 of the first embodiment, it is possible to form each side by connecting plural straight lines in series. For example, as shown in FIG. 7, each of the sides 721 to 726 in the cell wall 702 in each hexagonal cell 703 is composed of two straight lines connected in series so that the connected lines has a concave-curve shape, similar to the configuration of each side 21 to 26 of the hexagonal cell 3 shown in FIG. 2 and FIG. 3. This configuration of the sides 721 to 726 in the cell wall 702 in each hexagonal cell 703 has the capability to distribute the stress applied from the outside and inside of the honeycomb structure body, like the configuration of the sides 21 to 26 in the cell wall 20 in each hexagonal cell 30.

Figure 10:
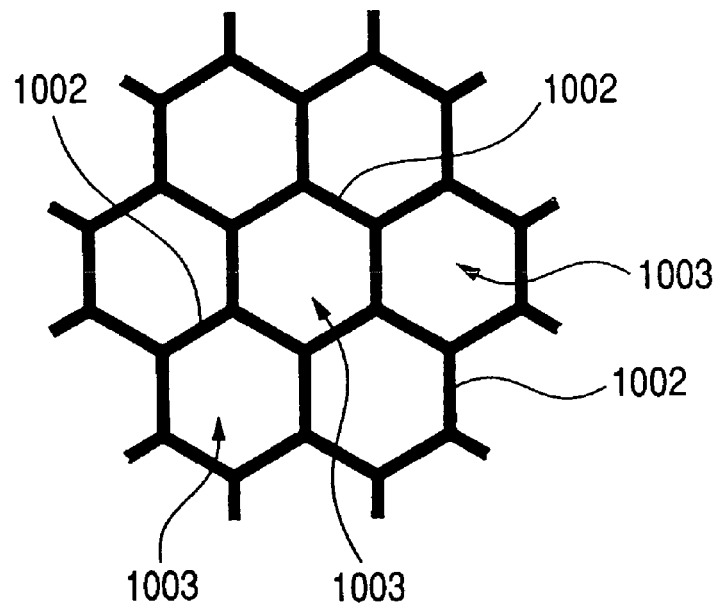
FIG. 10 is a diagram showing each cell wall in each cell as a conventional honeycomb structure body.

In the honeycomb structure body 1 of the first embodiment, although each of the hexagonal cells 3 is surrounded by the hexagonal cell wall 2 that has the sides 21 to 26 of the character "C" shape (or a circular arc shape), it is preferred to form some hexagonal cells with cell walls composed of straight lines, like the shape of the cell wall 1002 in the conventional cell 1003 shown in FIG. 10. However, when the number of the cells surrounded by the straight-line shaped cell walls is increased, there is a possibility to decrease the entire strength and flexibility of the honeycomb structure body to the stress applied from the inside and outside thereof.

Further, when the honeycomb structure body is made of a combination of the hexagonal cells 3 of the first embodiment shown in FIG. 2 and FIG. 3 and the conventional type hexagonal cells surrounded by the straight-line cell walls, it is preferred to arrange so that the number of conventional type hexagonal cells is gradually decreased from the center part toward the outer peripheral part when observed from the cross-section of the honeycomb structure body. In other words, it is preferred to arrange so that the number of the hexagonal cells of the first embodiment is gradually increased from the center part toward the outer peripheral part of the honeycomb structure body. This configuration has the effect to decrease the magnitude of the stress applied from the outside of the honeycomb structure body.

The honeycomb structure body 1 according to the first embodiment of the present invention is mainly used as an exhaust gas purifying filter for use in gasoline engines. However, the present invention is not limited by this application, and it is possible to apply the honeycomb structure body 1 of the first embodiment to an exhaust gas purifying filter for diesel engines as a diesel particulate filter (DPF).

Second Embodiment

A description will be given of the honeycomb structure body having a plurality of hexagonal cells according to the second embodiment of the present invention with reference to FIG. 8.

Figure 8:
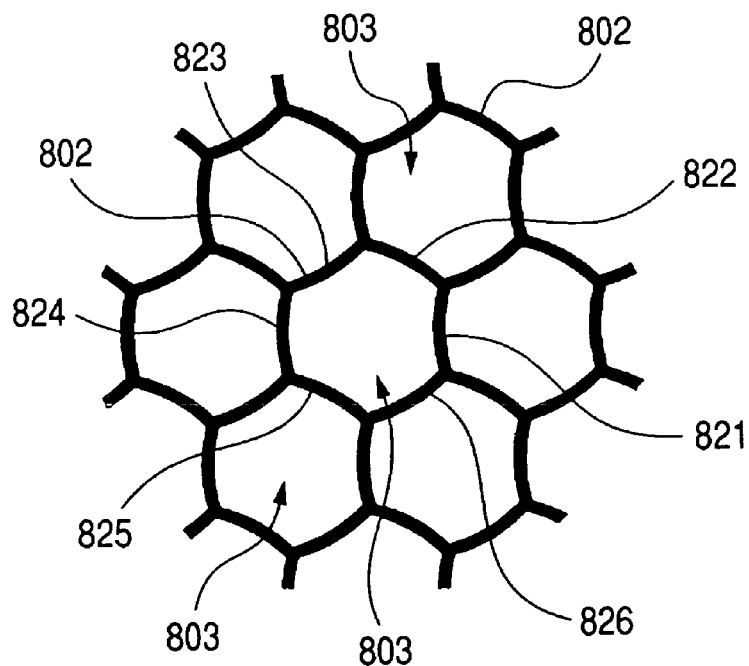
FIG. 8 is a diagram showing cell walls (or partition walls) in hexagonal cells in a honeycomb structure body according to the second embodiment of the present invention.

FIG. 8 is a diagram which mainly shows hexagonal cell walls (or partition walls) surrounding the hexagonal cross-sectional cells (hereinafter, referred to as "the hexagonal cells", similar to the case of the first embodiment) in the honeycomb structure body of the second embodiment. As shown in FIG. 8, the shape of the hexagonal cell wall in the second embodiment is a modification of the shape of the hexagonal cell wall 2 in the honeycomb structure body 1 of the first embodiment shown in FIG. 2 and FIG. 3.

As shown in FIG. 8, the sides 821 to 826 of the cell wall 802 of each hexagonal cell 803 have a concave-curved shape and a convex-curved shape alternately. In other words, one side of the concave-curved shape (as the character "C" shape to the inside of the hexagonal cell 802) in the hexagonal cell wall 802 is connected to the adjacent side of the convex-curved shape (as the character "C" shape to the outside of the hexagonal cell 802) in each hexagonal cell wall 802. In one hexagonal cell 803, the sides 821, 823, and 825 have the character "C" shape that is concave to the inside of the hexagonal cell 803, and the sides 822, 824, and 826 have the character "C" shape that is concave to the outside of the hexagonal cell 803. Other configuration of the honeycomb structure body of the second embodiment is equal to the configuration of the honeycomb structure body of the first embodiment.

Like the action and effects of the honeycomb structure body according to the first embodiment, the honeycomb structure body of the second embodiment can adequately distribute a stress applied from the inside and the outside of the honeycomb structure body 1.

Third Embodiment

Experimental Results

A description will now be given of the experimental results regarding the maximum stress value of the honeycomb structure body 1 according to the first embodiment based on CAE (computer aided engineering) analysis.

Figure 9:
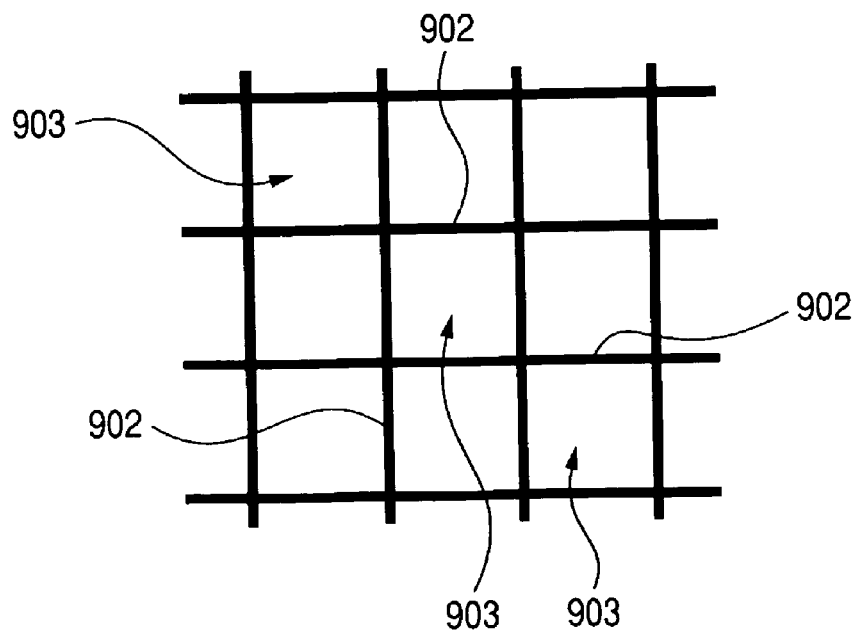
FIG. 9 is a diagram showing each cell wall in each cell as a conventional honeycomb structure body.
Figure 11:
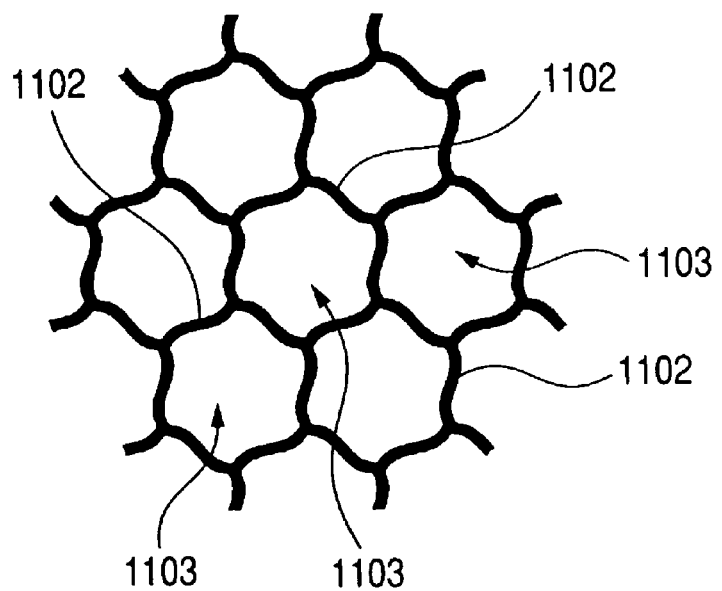
FIG. 11 is a diagram showing another configuration of cell walls in cells of a honeycomb structure body.

FIG. 9 is a diagram showing the square shaped cell walls (or partition walls) in square shaped cells of a conventional honeycomb structure body as the conventional sample C1. FIG. 10 is a diagram showing the cell walls (or partition walls) of each cell as a conventional hexagonal structure body as the conventional sample C2. FIG. 11 is a diagram showing another configuration of each hexagonal cell 1103 and its cell wall 1102 (or a partition wall) in the honeycomb structure body.

In the experiment, following three samples E1, E2, and E3 were prepared as the honeycomb structure body 1 according to the first embodiment, where the length of each side in the samples E1, E2, and E3 is approximately 3.0 mm (E1), 4.0 mm (E2), and 5.0 mm (E3), respectively, and the external diameter is approximately 103.0 mm, the thickness of the cell wall 2 is 90 μm, the cell pitch is approximately 111 μm, and the thickness of the outer peripheral skin part 4 is approximately 4.0 mm, and each honeycomb structure body 1 has approximately 600.0 meshes (the number of the cells is 600).

In the experiment, two kinds of conventional samples C1 and C2 were prepared as the conventional honeycomb structure body. In the conventional sample C1 shown in FIG. 9, each cell has a square cross-sectional shape, not any hexagonal shape, and each side of the cell wall is a straight line shape. In the conventional sample C2 shown in FIG. 10, each cell has a hexagonal cross-sectional shape, but each side of the cell has a straight-line shape.

Another sample of the honeycomb structure body shown in FIG. 11 was further prepared. The honeycomb structure body shown in FIG. 11 has the same basic configuration of the honeycomb structure body shown in FIG. 2 and FIG. 3, but each side of the cell wall has both the concave shape and the convex shape. Each side of the hexagonal cell wall 1102 in each hexagonal cell 1103 of the honeycomb structure body shown in FIG. 11 has the character "S" shape, not the character "C" shape.

In the three types of the honeycomb structure bodies as the experimental examples C4, C5, and C6 shown in FIG. 11, the radius of each arc-shaped side of those samples C4, C5, and C6 is 2.0 mm (C4), 3.0 mm (C5), and 4.0 mm (C6), respectively.

The experimental samples C1 to C5 and E1 to E3 as the honeycomb structure bodies used in the experiment have the same basic size such as the length and the diameter of the honeycomb structure body other than the shape and size of each side of the cell wall surrounding each cell.

The CAE analysis that was used as the experimental tool will now be explained. The CAE analysis of the experiment used the samples of a two dimensional model (as a plane model) of a quarter-size body (¼ size body as a fan-shaped body) having two dimension elements as limitation conditions. For easily performing the comparison in shape between the samples, the longitudinal length of each experimental sample was same and the number of divided parts of the honeycomb structure body was the same number. Young coefficient and Poisson's ratio of the ceramic material forming each honeycomb structure body as the experimental samples were used as material characteristics. Under those conditions, the maximum stress value of each experimental sample was calculated.

Following Table 1 shows the maximum stress values for those experimental samples as the experimental results. As clearly shown in Table 1, the maximum stress value of each of the experimental samples E1 to E3 according to the embodiments of the present invention are lower than those of the conventional sample C2. That is, the hexagonal honeycomb structure bodies of the embodiments of the present invention as the experimental samples E1 to E3 have more flexibility characteristic when compared with the conventional sample C1.

On the other hand, as clearly shown in Table 1, the maximum stress values of the experimental samples E1 to E3 that correspond to the hexagonal honeycomb structure bodies of the embodiments according to the present invention have lower than the maximum stress values of the samples C3 to C5 shown in FIG. 11. That is, the experimental samples E1 to E3 having each side of the character "C" shape have the improved and superior flexibility characteristic rather than that of the experimental samples C3 to C5 in which each side of the character "S" shape forming each cell wall of each cell.

The reason why is that the character "S" shape of each side that forms the hexagonal cell wall 1102, that surrounds each hexagonal cell 1103 in the experimental examples C3 to C5 shown in FIG. 11, changes its curved direction at the middle point of the side of the character "S" shape. That is, the character "S" shape in the side that forms the cell wall in each cell has both the concave-curved part and the convex-curved part that are divided at the middle part of the side, and a length of each divided part of the side of the cell wall is shorter than a length of the side of the character "C" shape in the hexagonal cell wall for each cell of the experimental samples E1 to E3. Thus, the experimental samples E1, E2, and E3 of the present invention having each side of the character "C" shape in each cell wall for the cell of the honeycomb structure body according to the present invention has a superior capability of distributing a stress when compared with that of the conventional samples.

Further, the experimental result shows that the maximum stress value of the experimental sample E1 is lower than that of the conventional sample C1, wherein the experimental sample E1 has the hexagonal shaped cell and the conventional sample C1 has the square shaped cell. Still further, the experimental result shows that the maximum stress value of the experimental sample E2 is approximately equal to that of the conventional sample C1, and the maximum stress value of the experimental sample E3 is slightly greater than that of the conventional sample C1. This shows that the honeycomb structure body according to the present invention shown in FIG. 2 to FIG. 8 has its optimum shape such as an optimum radius of each side having the character "C" shape (namely, an arc-shape) under the various conditions, the thickness of each hexagonal cell wall, and the longitudinal length and the cell pitch of the honeycomb structure body.

TABLE 1

| Sample No. | Maximum stress value (MPa) |
|---|---|
| E1 | 1.412 |
| E2 | 1.623 |
| E3 | 1.777 |
| C1 | 1.605 |
| C2 | 2.652 |

TABLE 1-continued

| Sample No. | Maximum stress value (MPa) |
|---|---|
| C3 | 2.323 |
| C4 | 1.851 |
| C5 | 2.560 |

As described above in detail, the honeycomb structure body according to the present invention has a superior flexibility characteristic to the stress applied from the inside and the outside of the honeycomb structure body, and the characteristic is capable of increasing the durability and thermal shock resistance during the use of the honeycomb structure body.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A honeycomb structure body comprising:
a plurality of hexagonal cells formed in a lattice arrangement, each hexagonal cell having a hexagonal cross-sectional shape surrounded by a hexagonal cell wall of a hexagonal cross-sectional shape composed of six sides,
wherein each side of the hexagonal cell wall has a single concave shape so as to be concave only toward an inside or only toward an outside of the hexagonal cell in a cross-sectional plane of the honeycomb structure body, transverse to an axis direction of the honeycomb structure body, three consecutive sides of each hexagonal cell wall being concave only toward the inside of the hexagonal cell, and the remaining three consecutive sides of each hexagonal cell being concave only toward the outside of the hexagonal cell.

2. A honeycomb structure body comprising:
a plurality of hexagonal cells formed in a lattice arrangement, each hexagonal cell having a hexagonal cross-sectional shape surrounded by a hexagonal cell wall of a hexagonal cross-sectional shape composed of six sides,
wherein each side of the hexagonal cell wall has a single concave shape so as to be concave only toward an inside or only toward an outside of the hexagonal cell in a cross-sectional plane of the honeycomb structure body, transverse to an axis direction of the honeycomb structure body,
wherein adjacent sides in the six sides of the hexagonal cell wall are concave only toward the inside and only toward the outside of the hexagonal cell, respectively, whereby the sides of the hexagonal cell wall respectively alternate, about a circumference of the hexagonal cell, between being concave only toward the inside and being concave only toward the outside.

3. The honeycomb structure body according to claim 1, wherein each side of the hexagonal cell wall is composed of a plurality of cell wall segments, the cross-section of each of said cell wall segments in said cross-sectional plane being a straight line, the straight cell wall segments collectively forming said concave shape.

4. The honeycomb structure body according to claim 2, wherein each side of the hexagonal cell wall is composed of a plurality of cell wall segments, the cross-section of each of said cell wall segments in said cross-sectional plane being a straight line, the straight cell wall segments collectively forming said concave shape.

5. The honeycomb structure body according to claim 1, further comprising an outer peripheral skin part formed on an outer surface of the honeycomb structure body.

6. The honeycomb structure body according to claim 2, further comprising an outer peripheral skin part formed on an outer surface of the honeycomb structure body.

7. The honeycomb structure body according to claim 1, wherein a thickness of each side of the hexagonal cell wall is within a range of 30 μm to 110 μm.

8. The honeycomb structure body according to claim 2, wherein a thickness of each side of the hexagonal cell wall is within a range of 30 μm to 110 μm.

9. The honeycomb structure body according to claim 1, wherein a thickness of each side of the hexagonal cell wall is 90 μm, a cell pitch of the hexagonal cells is 111 μm, a longitudinal length of the honeycomb structure body is 100.0 mm, an outer diameter of the honeycomb structure body is 103.0 mm.

10. A honeycomb structure body comprising:
a plurality of hexagonal cells formed in a lattice arrangement, each hexagonal cell having a hexagonal cross-sectional shape surrounded by a hexagonal cell wall of a hexagonal cross-sectional shape composed of six sides,
wherein each side of the hexagonal cell wall has a concave shape toward one of an inside and an outside of the hexagonal cell in a cross-sectional plane of the honeycomb structure body, transverse to an axis direction of the honeycomb structure body, three consecutive sides of each hexagonal cell wall having a concave shape that is concave toward the inside of the hexagonal cell, and the remaining three consecutive sides of each hexagonal cell having a concave shape that is concave toward the outside of the hexagonal cell, and
wherein a thickness of each side of the hexagonal cell wall is 90 μm, a cell pitch of the hexagonal cells is 111 μm, a longitudinal length of the honeycomb structure body is 100.0 mm, an outer diameter of the honeycomb structure body is 103.0 mm.

11. The honeycomb structure body according to claim 10, wherein each side of the hexagonal cell wall is composed of a plurality of cell wall segments, the cross-section of each of said cell wall segments in said cross-sectional plane being a straight line, the straight cell wall segments collectively forming said concave shape.

12. The honeycomb structure body according to claim 10, further comprising an outer peripheral skin part formed on an outer surface of the honeycomb structure body.

13. A honeycomb structure body comprising:
a plurality of hexagonal cells formed in a lattice arrangement, each hexagonal cell having a hexagonal cross-sectional shape surrounded by a hexagonal cell wall of a hexagonal cross-sectional shape composed of six sides,
wherein each side of the hexagonal cell wall has a concave shape toward one of an inside and an outside of the hexagonal cell in a cross-sectional plane of the honeycomb structure body, transverse to an axis direction of the honeycomb structure body,
wherein adjacent sides in the six sides of the hexagonal cell wall are concave toward the inside and outside of the hexagonal cell, respectively, whereby the sides of the hexagonal cell wall respectively alternate, about a circumference of the hexagonal cell, between being concave to the inside and concave to the outside, and wherein a thickness of each side of the hexagonal cell wall is 90 μm, a cell pitch of the hexagonal cells is 111 μm, a longitudinal length of the honeycomb structure body is 100.0 mm, an outer diameter of the honeycomb structure body is 103.0 mm.

14. The honeycomb structure body according to claim 13, wherein each side of the hexagonal cell wall is composed of a plurality of cell wall segments, the cross-section of each of said cell wall segments in said cross-sectional plane being a straight line, the straight cell wall segments collectively forming said concave shape.

15. The honeycomb structure body according to claim 13, further comprising an outer peripheral skin part formed on an outer surface of the honeycomb structure body.

* * * * *